(12) United States Patent
Baker et al.

(10) Patent No.: US 9,935,693 B2
(45) Date of Patent: *Apr. 3, 2018

(54) METHOD FOR COMMUNICATING IN A MIMO NETWORK

(71) Applicant: KONINKLIJKE PHILIPS N.V., Eindhoven (NL)

(72) Inventors: Matthew P. J. Baker, Canterbury (GB); Milos Tesanovic, Harrow (GB); Timothy J. Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 116 days.

This patent is subject to a terminal disclaimer.

(21) Appl. No.: 14/753,596

(22) Filed: Jun. 29, 2015

(65) Prior Publication Data

US 2015/0304002 A1    Oct. 22, 2015

Related U.S. Application Data

(63) Continuation of application No. 13/257,136, filed as application No. PCT/IB2010/051130 on Mar. 16, 2010, now Pat. No. 9,071,389.

(30) Foreign Application Priority Data

Mar. 17, 2009  (EP) ..................... 09155424

(51) Int. Cl.
*H04W 72/10*    (2009.01)
*H04L 25/03*    (2006.01)
(Continued)

(52) U.S. Cl.
CPC ......... *H04B 7/0456* (2013.01); *H04B 7/0417* (2013.01); *H04B 7/0452* (2013.01);
(Continued)

(58) Field of Classification Search
CPC ..... H04L 47/50; H04L 9/0869; H04L 9/0662; H04L 12/18; G06F 7/582; G06F 7/58; G06F 7/588

See application file for complete search history.

(56) References Cited

U.S. PATENT DOCUMENTS

2006/0209980 A1    9/2006    Kim et al.
2007/0223423 A1    9/2007    Kim et al.
(Continued)

FOREIGN PATENT DOCUMENTS

WO    2008098225 A2    8/2008
WO    2008104907 A2    9/2008
(Continued)

OTHER PUBLICATIONS

Ericsson: "Precoding Consideration in LTE MIMO Downlink"; 3GPP Draft, R1-071044, 3rd Generation Partnership Project, TSG-RAN WG1 #48, Feb. 2007, 11 Page Document.*

(Continued)

*Primary Examiner* — Romani Ohri

(57) ABSTRACT

The present invention relates to a method for communicating in a network, said network comprising a primary station and at least a first secondary station, wherein the first secondary station transmits to the primary station an indication of a first plurality of precoding vectors, wherein the number of first precoding vectors is greater than a preferred rank of transmission from the primary station to the first secondary station.

25 Claims, 2 Drawing Sheets

(51) Int. Cl.
*H04B 7/0456* (2017.01)
*H04B 7/0417* (2017.01)
*H04B 7/0452* (2017.01)
*H04L 1/00* (2006.01)
*H04L 25/02* (2006.01)
*H04B 7/06* (2006.01)

(52) U.S. Cl.
CPC .......... *H04L 1/0001* (2013.01); *H04L 1/0025* (2013.01); *H04L 25/0242* (2013.01); *H04L 25/03* (2013.01); *H04W 72/10* (2013.01); *H04B 7/0626* (2013.01); *H04L 25/03343* (2013.01)

(56) References Cited

U.S. PATENT DOCUMENTS

| | | | |
|---|---|---|---|
| 2008/0159425 A1 | 7/2008 | Khojastepour et al. | |
| 2008/0212702 A1* | 9/2008 | Pan | H04B 7/0417 375/260 |
| 2008/0225960 A1* | 9/2008 | Kotecha | H04B 7/0413 375/259 |
| 2009/0046788 A1* | 2/2009 | Kotecha | H04B 7/0417 375/260 |
| 2009/0066577 A1 | 3/2009 | Kim et al. | |
| 2009/0074099 A1* | 3/2009 | Zheng | H04L 1/0017 375/267 |
| 2009/0160707 A1* | 6/2009 | Lakkis | H04B 7/0417 342/367 |
| 2010/0027713 A1 | 2/2010 | Huang et al. | |
| 2010/0183085 A1* | 7/2010 | Taoka | H04B 7/0417 375/260 |
| 2010/0227639 A1* | 9/2010 | Kim | H04B 1/005 455/525 |
| 2011/0032849 A1* | 2/2011 | Yeung | H04B 7/0434 370/280 |

FOREIGN PATENT DOCUMENTS

| | | |
|---|---|---|
| WO | 2008132689 A1 | 11/2008 |
| WO | 2009026768 A1 | 3/2009 |
| WO | 2009026769 A1 | 3/2009 |

OTHER PUBLICATIONS

Huawei, "Completing the 2 TX Codebook", TSG RAN WG1 Meeting #50BIS, Shanghai, China, R1-074228, Oct. 2007, pp. 1-2.
Alcatel-Lucent, "Best Companion Reporting for Improved Single-Cell MU-MIMO Pairing", 3GPP TSG RAN WG1#56 Meeting, Althens, Greece, R1-090926, Feb. 2009, pp. 1-5.
ZTE, "Considerations on DL Signaling for Support of SU- and MU-MIMO", 3GPP TSG-RAN WG1#51, Jeju, Korea, Nov. 5-9, 2007, 3 Pages.
Trivellato et al, "Antenna Combining and Codebook Design for the MIMO Broadcast Channel With Limited Feedback", Conference Record of the IEEE 41st Asilomar Conference on Signals, Systems and Computers, Nov. 2007, pp. 302-308.
Bala et al, "Zero-Forcing Beamforming Codebook Design for MU-MIMO OFDM Systems", IEEE 68th Vehicular Technology Conference—VTC 2008, Sep. 2008, pp. 1-5.
Ericsson", Precoding Consideration in LTE MIMO Downlink", 3GPP Draft, R1-071044, 3rd Generation Partnership Project, TSG-RAN WG1#48, Feb. 2007, 11 Pages Document.
Want et al, "Precoding for MIMO-Braodcast Channels With Joint Linear Transmitter and Receiver Design", IEEE International Symposium on Wireless Communication Systems Oct. 2008, pp. 424-427.
Spencer, "Zero-Forcing Methods for Downlink Spatial Multiplexing in Multiuser MIMO Channels", IEEE Transactions on Signal Processing, vol. 52, No. 2, 2004, pp. 461-471.
Philips, "Comparison of MU-MIMO Feedback Schemes With Multiple UE Receive Antennas", 3GPP TSG RAN WG1 Meeting #47BIS, Sorrento, Italy, 2007, R1-070346, pp. 1-7.

* cited by examiner

METHOD FOR COMMUNICATING IN A MIMO NETWORK

CLAIM OF PRIORITY

This application claims the benefit or priority of and describes the relationships between the following applications: wherein this application is a continuation of U.S. patent application Ser. No. 13/257,136, filed Sep. 16, 2012, which is a National Stage of International Application No. PCT/IB10/51130 filed Mar. 16, 2010, which claims foreign priority from EP application EP09155424 filed Mar. 17, 2009, all of which are incorporated herein in whole by reference.

FIELD OF THE INVENTION

The present invention relates to a method for communicating in a communication network. More specifically, it relates to a method for communicating between a primary station and one or more secondary stations, in a MIMO (Multiple Input Multiple Output) mode. It also relates to primary stations or secondary stations able to implement such a method.

This invention is, for example, relevant for all wireless communication networks, and in an example of the following description, for a mobile telecommunication network such as UMTS, or UMTS LTE.

BACKGROUND OF THE INVENTION

In communication networks, in order to increase the reachable throughput of communication, MIMO (Multiple Input, Multiple Output) has been proposed widely. MIMO involves the use of multiple antennas at both the transmitter and receiver to improve communication performance. It indeed offers significant increases in data throughput without additional bandwidth or transmit power by higher spectral efficiency (more bits per second per hertz of bandwidth) and link reliability.

Multi User MIMO (MU-MIMO) is an advanced MIMO, allowing a station to communicate with multiple users in the same band simultaneously. In an exemplary embodiment of the invention, a mobile communication network comprises a primary station (base station, or NodeB or eNodeB) which can communicate simultaneously with a plurality of secondary stations (mobile stations, or User Equipment, or UE) with MIMO streams, by using a plurality of primary station antennas and a plurality of secondary station antennas. In order to form the stream, the secondary stations provide the primary station with information related to the state of the channel by transmitting CSI (channel state information) feedback to the primary station. Such CSI indicates an optimal or at least a preferred precoding vector to be used in order to maximise the reachable data rate of the corresponding spatially separable data stream transmitted by the primary station. This precoding vector can be a set of complex values to be applied to each antenna port of the primary station during transmission to direct the data stream towards the secondary station antennas.

However, in the context of MU-MIMO, the signaled precoding vector when used may cause a beam interfering with another secondary station communicating at the same time with the primary station. Moreover, the secondary station is not able to evaluate where interfering stations are and whether the use of a precoding vector can cause interference. The sharing of the precoding vectors transmitted by the secondary stations in each secondary station would cause too much signaling and would require too much calculation power of each secondary station to generate non interfering precoding vectors.

SUMMARY OF THE INVENTION

It is an object of the invention to propose an improved method for communicating in a MU-MIMO network which alleviates the above described problems.

It is another object of the invention to propose a method for communicating which does not cause too much signaling while enhancing the channel quality by reducing interference.

Still another object of the invention is to propose a system comprising a primary station and secondary stations that can maximise the data throughput of the whole system.

To this end, in accordance with one aspect of the invention, a method is proposed for communicating in a network, said network comprising a primary station and at least a first secondary station, wherein the first secondary station transmits to the primary station an indication of a first plurality of precoding vectors, wherein the number of first precoding vectors is greater than a preferred rank of transmission from the primary station to the first secondary station.

What is meant by rank of transmission is the number of spatially separable data streams of the MIMO communication between the primary station and a given secondary station. It is to be noted that the rank cannot exceed the minimum of the number of antennas of the primary station and of the secondary station. For instance, a secondary station having four antennas cannot receive more than four spatially separable streams, so cannot exceed rank-4 communications. Moreover, a sixteen-antenna primary station cannot transmit more than 16 beams. As an example, such a primary station could transmit simultaneously four rank-4 MIMO transmissions to four secondary stations, or one rank-4 MIMO transmission to one secondary station with two rank-2 MIMO transmissions to another two secondary stations and eight rank-1 MIMO transmissions to another eight secondary stations.

As a consequence, the primary station is able to generate another precoding vector, for instance based on a linear combination of the plurality of vectors indicated in order to establish the communication. In the case of a MU-MIMO embodiment, the primary station is now able to generate a precoding vector that may be suboptimal from the point of view of the secondary station, but which permits to prevent interference between streams transmitted to different secondary stations. In a particular embodiment, the primary station selects a combination of precoding vectors, like a linear combination which does not require a lot of processing, so that the sum rate of all the transmission rates of the connected secondary stations is maximal.

In accordance with another aspect of the invention, a secondary station is proposed comprising means for communicating in a network with a primary station, the secondary station further comprising transmitting means arranged for transmitting to the primary station an indication of a first plurality of precoding vectors, wherein the number of first precoding vectors is greater than a preferred rank of transmission from the primary station to the first secondary station.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
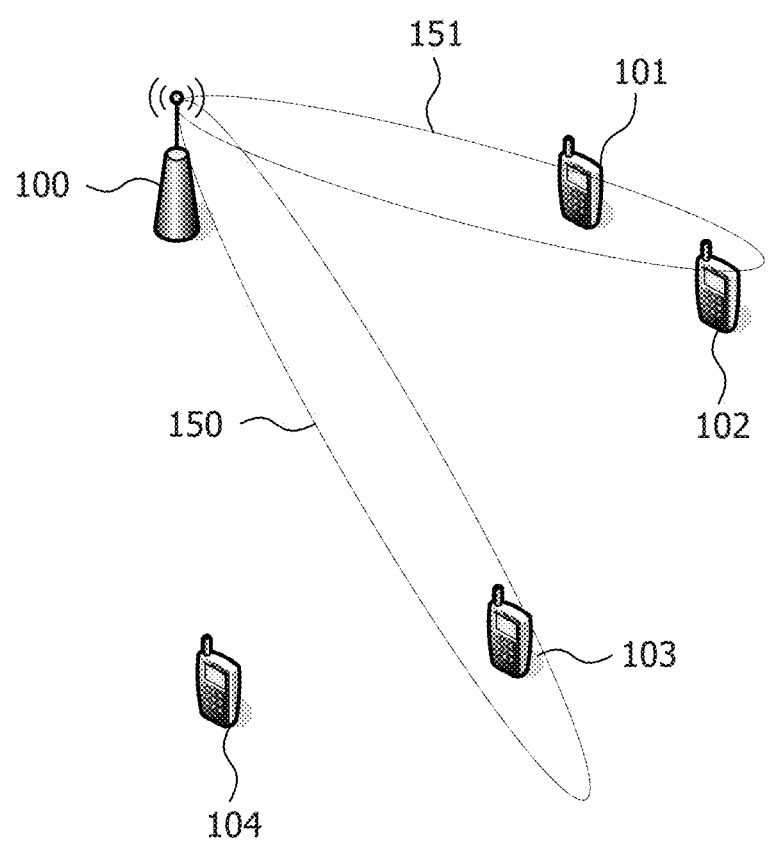
FIG. 1 is a block diagram of a network in accordance with a beamforming scheme maximizing the rate of one secondary station.

The present invention relates to a communication network having a primary station and a plurality of secondary stations communicating with the primary station. Such a network is illustrated for example in FIGS. 1 and 2, where a primary station or base station 100 communicates wirelessly with a plurality of secondary stations 101, 102, 103 and 104. In an illustrative example of the invention, the secondary stations 101-104 are mobile stations or user equipment of a UMTS network.

In accordance with a first embodiment of the invention, the primary station 100 comprises an antenna array comprising a plurality of antennas and a complex gain amplifier so that the primary station 100 is able to carry out beamforming, like MIMO beamforming Typically, the primary station comprises four antennas. In the most advanced versions of LTE, the primary stations may comprise 8, 16 antennas or more. Similarly, the secondary stations 101-104 comprise a plurality of antennas, e.g. 2 antennas for the UEs compliant with the first LTE release. In later releases, the secondary stations may have 4 or 8 antennas, or even more. Thanks to the antenna arrays, the primary station 100 can form beams of data streams, like the beams 150 and 151 depicted on FIG. 1. In order to form the beam and establish a MIMO communication, the generation of precoding vectors is essential, this generation requiring information about the state of the channel and computation on both the secondary station and the primary station sides.

For example, in the first release of the LTE specifications, the secondary stations configured to receive downlink transmissions in MU-MIMO and to make measurements of the downlink channel (typically using non-precoded common reference signals (CRS)) and transmit channel state information (CSI) feedback to the primary station, the eNodeB. This indicates a preferred precoding vector to be used for the downlink transmissions (PMI, precoding matrix indicator) and an associated CQI (Channel Quality Information) value indicating a corresponding modulation and coding scheme. In this example, the downlink transmissions are codebook based, meaning that the precoding vectors used for transmission are selected from a finite set. The chosen precoding vector is signaled to the secondary stations so that the secondary station can derive a phase reference as a corresponding linear combination of the Common Reference Signals (CRSs).

A secondary station with a single receive antenna feeds back the index of a single preferred precoding vector which enables the best quality transmission or the most reliable communication, for example the one which maximises the signal to interference ratio SINR at its antenna. This can be based on a predetermined codebook of transmit beamforming vectors, or direct channel vector quantisation (CVQ). In case the secondary station has two (or more) receive antennas, the situation is more complex and the approach taken depends on the size of the codebook available for the quantised CSI feedback. What could be done at such a secondary station would be to feed back the full channel matrix (or at least a quantised version of it). This would however require significant signaling overhead and resource.

In case of Rank-2 transmission, it is possible to feed back a preferred precoding matrix. This is however not appropriate if the secondary station prefers Rank 1 transmission, for example due to the rank of the channel matrix being limited, or if the secondary station is configured in a MIMO mode which only supports Rank-1 transmission, or if the primary station schedules only a Rank-1 transmission.

For Rank-1 transmission, in the case of a relatively small feedback codebook, it is feasible for a secondary station with two receive antennas to determine a single preferred precoding vector by deriving the receive combining vector which maximises the SINR for each transmit beamforming vector in the codebook. This single preferred precoding vector could typically be the MMSE (minimum mean square estimation) receive combining vector. The UE can report the transmit beamforming vector which maximises the maximum SINR.

For a single stream to one secondary station, this approach can be expressed as follows:

1. The received signal is given by y=Hgx+n where
   y is the received signal, a N×1 vector
   x is the transmitted signal, a 1×1 vector
   g is the precoding vector, M×1
   H is the channel matrix, N×M
   n is the noise at each receive antenna, a N×1 vector. For convenience H can be normalised so that the noise variances are equal.
   M is the number of transmit antennas at the eNB
   N is the number of receive antennas at the UE
2. For each possible g in a codebook of size C, compute the receive antenna weight vector w (1×N) such that wy=$\hat{x}$ minimises the error E[x−$\hat{x}$], i.e.: $w=(Hg)^H((Hg)(Hg)^H+\sigma^2 I)^{-1}$ 3. Report the g which maximises the SINR after computing the corresponding MMSE solution for w. This is equivalent to reporting g for a single receive antenna, where g is chosen to maximise the received SINR for an effective 1×M transmission channel given by wH.

4. The eNB scheduler will select pairs of UEs which report orthogonal g's (or at least g's with low cross-correlation).

In the case of channel vector quantisation (CVQ) based feedback, a similar approach may result in a single preferred precoding vector for the feedback. However, this is reliant on an assumption that zero-forcing beamforming at the primary station transmitter, and relies on an approximation of the resulting SINR.

The main drawback of the above approaches is that they do not necessarily maximise the sum rate in a cell using MU-MIMO, as a higher sum rate might be achieved by choosing a w which enables a different pairing of UEs but which does not maximise the SINR for each individual UE.

This can be illustrated in FIG. 1 with the beam 151 directed from the primary station 100 to the secondary station 101. Even if this beam 151 is the one maximising the SINR of the secondary station 101, it causes huge interference on the secondary station 102. This secondary station 102 will not be able to have a communication with a high SINR because of beam 151 which is directed straight at it.

Moreover, in some cases it is not feasible for the secondary station to compute a single weight vector w which optimises the SINR, and therefore it is not feasible to feed back a single preferred transmit precoding vector. Such cases include:

i) the case of a large feedback codebook, such that the number of different optimisations and SINR calculations becomes prohibitive;

ii) cases where the secondary station does not know the transmit precoding vector e.g.

a. transmit beamforming at the primary station where the phase reference is given by precoded reference signals instead of the CRS and an indicator of the actually-used precoding vector; in this case there is effectively an infinite number of transmit precoding vectors available, for each of which the secondary station would have to derive the optimal weight vector w;

b. channel vector quantisation based feedback, when an assumption of zero-forcing transmit beamforming may not necessarily be valid.

One aspect of the invention is based on the fact that for the cases identified above a large or even infinite number of w's are possible. This means that by varying w, it may be possible for the base station to select pairs of UEs which maximise the sum rate while not necessarily maximising the rate for any individual UE.

Figure 2:
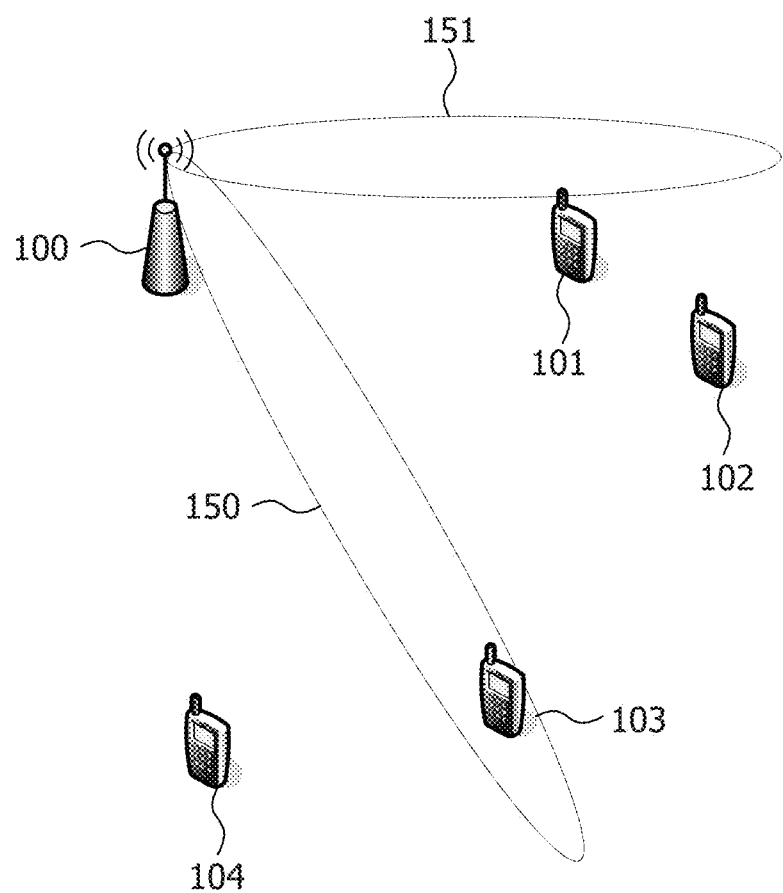
FIG. 2 is a block diagram of a network in accordance with an embodiment of the invention.

An exemplary variant of a first embodiment of the invention is depicted in FIG. 2, where the primary station 100 is able to direct the beam 151 so that the secondary station 102 is not disturbed by it. Even if the beam 151 does not provide the highest possible SINR value for the secondary station 101, the sum rate achievable for all the secondary stations can be better since the secondary station 102 is not interfered with by the beam 151 dedicated to another secondary station, namely 101.

To achieve this, it is proposed, in accordance with a first embodiment of the invention, that the secondary station feeds back to the primary station a set of preferred precoding vectors, the number of precoding vectors being greater than the preferred rank of transmission. The primary station may determine first the preferred rank of the transmission and configure the secondary station beforehand. Then, this permits that the secondary station is aware of the number of required precoding vectors that need to be fed back to the primary station. It also permits to limit the computation requirement at the secondary station which can be more limited than the primary station in terms of computation power.

It is however possible to let the secondary station decide on the preferred rank of transmission depending on the state of the channel so that it permits an optimal use of the channel. In such a case, the secondary station signals to the primary station the preferred rank of transmission.

According to a variant of the first embodiment, when applied in the case of two receive antennas at the secondary station or UE in an LTE network, each UE feeds back two precoding vectors g's, $g_1$ and $g_2$, even when rank-1 transmission is preferred. Each precoding vector g can be computed as above, by selecting two preferably-orthogonal receive vectors $w_1$ and $w_2$ which are known or have a relationship which is known, possibly a priori, to both the primary station and the secondary station.

According to an advantageous embodiment the first receive vector $w_1$ is computed to maximise the rate for a codebook-based feedback approach as described above. A corresponding CQI value, computed using this value of w, is also fed back, which gives sufficient information for the case when no other secondary stations end up being scheduled for transmission at the same time. The second vector $w_2$ can then be chosen as an orthogonal vector of $w_1$ (which gives sufficient information for optimal scheduling of another secondary station), and a second CQI value is computed for this value of w and is fed back as well. The secondary station also feeds back the corresponding g values, $g_1$ and $g_2$.

For two receive antennas at the secondary station, a suitable embodiment could use w vectors $w_1$=[1 1] and $w_2$=[1 −1] for example, or [0 1] and [1 0] corresponding to receive antenna selection.

It is to be noted that this exemplary embodiment of the invention can be extended to a secondary station with N reception antennas, in which case w is a vector of dimension 1×N. In such a case, the secondary station could transmit preferred precoding vector feedback corresponding to up to N w vectors. For example, if N=4, the secondary station could feed back 4 preferred precoding vectors, corresponding to $w_1$, $w_2$, $w_3$ and $w_4$, all of which could for example be orthogonal to each other.

In accordance with a variant of the above example, the secondary station could send a reduced amount of feedback corresponding to less than N w's. In such a case (e.g. for 2 w's), the choice of which particular w's could take into account the correlation between the receive antennas in order to maximise the information fed back to the primary station.

For example, if $w_1$ is selected to maximise the rate, then possible multipliers for generating $w_2$, $w_3$, and $w_4$ could be [1 1 −1 −1], [1 −1 1 −1], and [1 −1 −1 1]. Using $w_2$ is likely to be preferable to $w_3$ or $w_4$ (i.e. it would give the eNodeB more information) assuming that the antennas are indexed in order of separation (and hence correlation).

As a further aspect of the invention, therefore, the secondary station selects the second w according to the correlation between the antennas (as the primary station does not need to know the relationship between the antenna index and the physical antenna at the secondary station).

In another embodiment, the secondary station selects and feeds back the n w's which have the highest SINRs where n<N.

As a further example, if $w_1$ is selected as [1 1 1 1], then possible values for $w_2$, and $w_4$ could be [1 1 −1 −1], [1 −1 1 −1], and [1 −1 −1 1].

In an embodiment where N=2, the primary station scheduler is then free to select any $g_A$ for user A as a linear combination of $g_1$ and $g_2$ which orthogonalizes $g_A$ and a similarly-derived $g_B$ for user B. This can be extended to N>2, where the secondary station reports two (or more) values of g, and the eNB applies precoding which is a linear combination of the reported values.

If the secondary station reports N values of g corresponding to N values of w, this provides the eNB with some information on the full channel matrix. However, this has some advantages over known methods, since it is not necessary to specify the ordering of the receive antennas, and the computational complexity is likely to be lower for equivalent accuracy of channel representation (i.e. N searches of a codebook size C, compared with one search of a codebook size CN).

In a variant of the invention, the primary station is a mobile terminal like a User Equipment, and the primary station is a base station like an eNodeB.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A secondary station comprising:
   a plurality of antennas,
   a transceiver configured to communicate in a network with a primary station in accordance with a preferred rank of transmission, the transceiver being communicatively coupled to the plurality of antennas,
   a controller communicatively coupled to the transceiver and configured to:
   measure channel state information (CSI) of a downlink channel, and
   derive a first set of preferred precoding vectors based on the measured channel state information (CSI),
   wherein a number of preferred precoding vectors in the first set of derived preferred precoding vectors is greater than the preferred rank of transmission, and
   wherein the preferred rank of transmission is signaled by the secondary station to the primary station.

2. The secondary station of claim 1, wherein a transmission rank indicates the number of parallel layers of spatially separable data streams being simultaneously used for an associated data transmission between the primary station and the secondary station.

3. The secondary station of claim 1, wherein the preferred rank of transmission is a desired number of parallel layers of spatially separable data streams being pre-selected for simultaneous use for the associated data transmission between the primary and the secondary stations.

4. The secondary station of claim 1, wherein the transceiver is further configured to transmit to the primary station, at least one index corresponding to at least one derived preferred precoding vector from among the first set of derived preferred precoding vectors.

5. The secondary station of claim 1, wherein the transceiver is configured to transmit to the primary station, the first set of derived preferred precoding vectors.

6. The secondary station of claim 1, wherein the at least one index is based on one of: a predetermined codebook of transmit beamforming vectors, or direct channel vector quantization (CVQ).

7. The secondary station of claim 1, wherein the measurement of the channel state information is based on pre-coded common reference signals (CRS).

8. The secondary station of claim 1, wherein the preferred rank of transmission is configured by the primary station.

9. The secondary station of claim 1, wherein the preferred rank of transmission is predetermined.

10. The secondary station of claim 1, wherein the secondary station derives each precoding vector of the derived first set of precoding vectors according to a different corresponding receive combining vector.

11. The secondary station of claim 10, wherein the corresponding receive combining vectors are orthogonal to each other.

12. The secondary station of claim 1, wherein the number of derived first precoding vectors is less than the number of receive antennas of the secondary station.

13. The secondary station of claim 1, wherein the secondary station derives the first set of precoding vectors depending on at least one or more of: the correlation between the receive antennas of the secondary station, or a corresponding SINR for each precoding vector.

14. A primary station comprising:
    a plurality of antennas,
    a complex gain amplifier configured to perform beamforming using the plurality of antennas,
    a transceiver configured to communicate in a network with at least a first secondary station, and further configured to receive from the at least first secondary station a first set of indices indicative of a corresponding derived set of preferred precoding vectors, wherein the derived set of indices are derived at the at least first secondary station, and wherein a number of preferred precoding vectors is greater than a preferred rank of transmission from the primary station to the first secondary station, and
    a controller configured to:
    generate at least a first transmission precoding vector based on a first combination of the first precoding vectors of the first set, wherein the first set of precoding vectors is derived at the at least first secondary station, to establish an achievable transmission rate,
    generate at least a second transmission precoding vector based on a second combination of the first precoding vectors of a second derived set of precoding vectors derived at the at least first secondary station, wherein the second set of derived precoding vectors is indicated in a signaling from the at least first secondary station as a second set of indices, and
    wherein the first transmission precoding vector and the second transmission precoding vector are generated at the primary station so that the sum transmission rate comprising a sum of the first secondary station transmission rate and a second secondary station transmission rate is maximized.

15. The primary station of claim 14, wherein the at least second transmission precoding vector is a linear combination of precoding vectors of the first set of derived precoding vectors and the second set of derived precoding vectors.

16. The primary station of claim 15, wherein the first transmission precoding vector and the second transmission precoding vector are orthogonal.

17. The primary station of claim 14, wherein the number of generated precoding vectors is less than the number of receive antennas of the at least first secondary station.

18. The primary station of claim 14, wherein the at least first transmission precoding vector is a linear combination of preferred precoding vectors from among the first set of preferred precoding vectors generated at the at least first secondary station.

19. The primary station of claim 14, wherein the transceiver is further configured to receive the at least first precoding vector and a corresponding receive combining vector from the at least first secondary station.

20. The primary station of claim 14, wherein the preferred rank of transmission is configured by the primary station.

21. The primary station of claim 14, wherein the preferred rank of transmission is predetermined.

22. A primary station method of operating a primary station for communicating in a network with at least a first secondary station, the method comprising performing the acts of:

in the primary station:

receiving via a transceiver through a plurality of antennas controlled for beamforming by a complex gain amplifier, from the at least first secondary station, a first set of indices indicative of a derived set of preferred precoding vectors, wherein the derived set of indices are derived at the at least first secondary station, and wherein a number of preferred precoding vectors is greater than a preferred rank of transmission from the primary station to the first secondary station, and generating at least a first transmission precoding vector based on a first combination of the first precoding vectors of the first set, wherein the first set of precoding vectors is derived at the at least first secondary station, to establish an achievable transmission rate, generating at least a second transmission precoding vector based on a second combination of the first precoding vectors of a second derived set of precoding vectors derived at the at least first secondary station, wherein the second set of derived precoding vectors is indicated in a signaling from the at least first secondary station as a second set of indices, and wherein the first transmission precoding vector and the second transmission precoding vector are generated at the primary station so that the sum transmission rate comprising a sum of the first secondary station transmission rate and a second secondary station transmission rate is maximized.

23. A secondary station method of operating a secondary station for communicating in a network with a primary station, the method comprising the acts of:

in the secondary station:

measuring via a processor, channel state information (CSI) of a downlink channel, generating via the processor, a first set of preferred precoding vectors based on the measured channel state information (CSI), wherein a number of preferred precoding vectors in the first set of preferred precoding vectors is greater than a preferred rank of transmission, and transmitting via a transceiver and a plurality of antennas, to a primary station, a set of indices indicative of the generated first set of preferred precoding vectors, and wherein the preferred rank of transmission is signaled by the first secondary station to the primary station.

24. A tangible computer-readable storage medium, that is not a transitive propagating signal or wave, modified with control information including instructions for operating a primary station to perform a method of communicating over a network with at least a first secondary station, the method comprising, in the primary station, performing the acts of:

in the primary station:

receiving via a transceiver through a plurality of antennas controlled for beamforming by a complex gain amplifier from the at least first secondary station a first set of indices indicative of a corresponding derived set of preferred precoding vectors, wherein the derived set of indices are derived at the at least first secondary station, and wherein a number of preferred precoding vectors is greater than preferred rank of transmission from the primary station to the first secondary station, and generating at least a first transmission precoding vector based on a linear combination of the derived set of preferred precoding vectors to establish an achievable transmission rate generate at least a second transmission precoding vector based on a second combination of the first precoding vectors of a second derived set of precoding vectors derived at the at least first secondary station, wherein the second set of derived precoding vectors is indicated in a signaling from the at least first secondary station as a second set of indices, and wherein the first transmission precoding vector and the second transmission precoding vector are generated at the primary station so that the sum transmission rate comprising a sum of the first secondary station transmission rate and a second secondary station transmission rate is maximized.

25. A tangible computer-readable storage medium, that is not a transitive propagating signal or wave, modified with control information including instructions for operating a primary station to perform a method of communicating over a network with at least a primary station, the method comprising, in the secondary station, performing the acts of:

in the secondary station:

measuring via a processor, channel state information of a downlink channel, deriving via the processor, a first set of preferred precoding vectors based on the measured channel state information, wherein a number of preferred precoding vectors in the first set of preferred precoding vectors is greater than a preferred rank of transmission, and transmitting to a primary station, a set of indices indicative of the derived first set of preferred precoding vectors, and transmitting to the primary station, a preferred rank of transmission.

* * * * *